US010280595B2

(12) United States Patent
Ferracin et al.

(10) Patent No.: US 10,280,595 B2
(45) Date of Patent: May 7, 2019

(54) COMPACT WHEEL LOADER

(71) Applicant: CNH Industrial America LLC, New Holland, PA (US)

(72) Inventors: Paolo Ferracin, San Prospero Sul Secchia (IT); Adriano Garramone, Lecce (IT); Andrea Gravili, Lecce (IT); Giuseppina Razetto, Turin (IT); Gianpiero Negri, Mercato San Severino (IT); Michael Read, Batavia, IL (US); Marco Pietro Ciarrocchi, Sant'Omero (IT)

(73) Assignee: CNH Industrial America LLC, New Holland, PA (US)

( * ) Notice: Subject to any disclaimer, the term of this patent is extended or adjusted under 35 U.S.C. 154(b) by 157 days.

(21) Appl. No.: 15/123,534

(22) PCT Filed: Mar. 2, 2015

(86) PCT No.: PCT/EP2015/054246
§ 371 (c)(1),
(2) Date: Sep. 2, 2016

(87) PCT Pub. No.: WO2015/132175
PCT Pub. Date: Sep. 11, 2015

(65) Prior Publication Data
US 2017/0081826 A1    Mar. 23, 2017

(30) Foreign Application Priority Data

Mar. 3, 2014  (IT) .............................. MO2014A0051

(51) Int. Cl.
*E02F 9/22*       (2006.01)
*F16H 61/433*  (2010.01)
(Continued)

(52) U.S. Cl.
CPC .............. *E02F 9/2253* (2013.01); *E02F 3/34* (2013.01); *E02F 9/2058* (2013.01);
(Continued)

(58) Field of Classification Search
CPC ............ F15B 2211/20553; F15B 11/08; E02F 9/2253; E02F 3/34; E02F 9/2285;
(Continued)

(56) References Cited

U.S. PATENT DOCUMENTS 5,447,029 A     9/1995  Swick et al.
5,653,107 A     8/1997  Beck
(Continued)

FOREIGN PATENT DOCUMENTS

EP           2357116 A1      8/2011
JP       2006082770 A       3/2006
(Continued)

*Primary Examiner* — Abiy Teka
(74) *Attorney, Agent, or Firm* — Peter K. Zacharias; Patrick M. Sheldrake

(57) ABSTRACT

A compact wheel loader having a hydrostatic transmission and two modes of operation. In a normal mode, a demand lever is used to set the engine speed, and displacement of the swash plate of the hydraulic pump of the transmission is set by a hydraulic pilot pressure (Ps) that increases with engine speed, so that the transmission ratio automatically decreases as the engine speed increased. In a creeper mode, the engine is set to operate at a high speed to meet the demand of powered implements of the loader, and the wheel speed is controlled by the demand lever setting the transmission ratio by varying the hydraulic pilot pressure (Ps).

6 Claims, 1 Drawing Sheet

(51) Int. Cl.
   *E02F 3/34* (2006.01)
   *E02F 9/20* (2006.01)
   *F15B 11/08* (2006.01)

(52) U.S. Cl.
   CPC .......... *E02F 9/2285* (2013.01); *E02F 9/2292* (2013.01); *E02F 9/2296* (2013.01); *F15B 11/08* (2013.01); *F16H 61/433* (2013.01); *B60W 2300/17* (2013.01); *F15B 2211/20523* (2013.01); *F15B 2211/20553* (2013.01); *F15B 2211/575* (2013.01)

(58) Field of Classification Search
   CPC ..... E02F 9/2296; E02F 9/2058; E02F 9/2292; F16H 61/433
   See application file for complete search history.

(56) References Cited

U.S. PATENT DOCUMENTS

| | | |
|---|---|---|
| 5,946,910 A | 9/1999 | Hayashi et al. |
| 6,851,495 B2 | 2/2005 | Sprinkle et al. |
| 6,854,549 B2 | 2/2005 | Calamari et al. |
| 7,240,489 B2 | 7/2007 | Hofer |
| 7,686,737 B2 | 3/2010 | Nishi et al. |
| 8,185,278 B2 | 5/2012 | Price et al. |
| 8,353,271 B2 | 1/2013 | Nishi et al. |
| 8,483,927 B2 | 7/2013 | Matsuzaki et al. |
| 8,532,886 B1 | 9/2013 | Shirao et al. |
| 8,676,467 B2 | 3/2014 | Fujimoto et al. |
| 8,696,509 B2 | 4/2014 | Panizzolo et al. |
| 8,777,808 B2 | 7/2014 | Hyodo et al. |
| 8,888,657 B2 | 11/2014 | Kitao et al. |
| 2004/0211614 A1 | 10/2004 | Matsuyama |
| 2005/0115760 A1 | 6/2005 | Sprinkle et al. |
| 2008/0214348 A1 | 9/2008 | Hasegawa et al. |
| 2014/0290236 A1* | 10/2014 | Aizawa .................. F16H 39/02 60/443 |

FOREIGN PATENT DOCUMENTS

| | | |
|---|---|---|
| JP | 2006125535 A | 5/2006 |
| JP | 2011241969 A | 12/2011 |
| JP | 2012167789 A | 9/2012 |
| JP | 2013007470 A | 1/2013 |

* cited by examiner

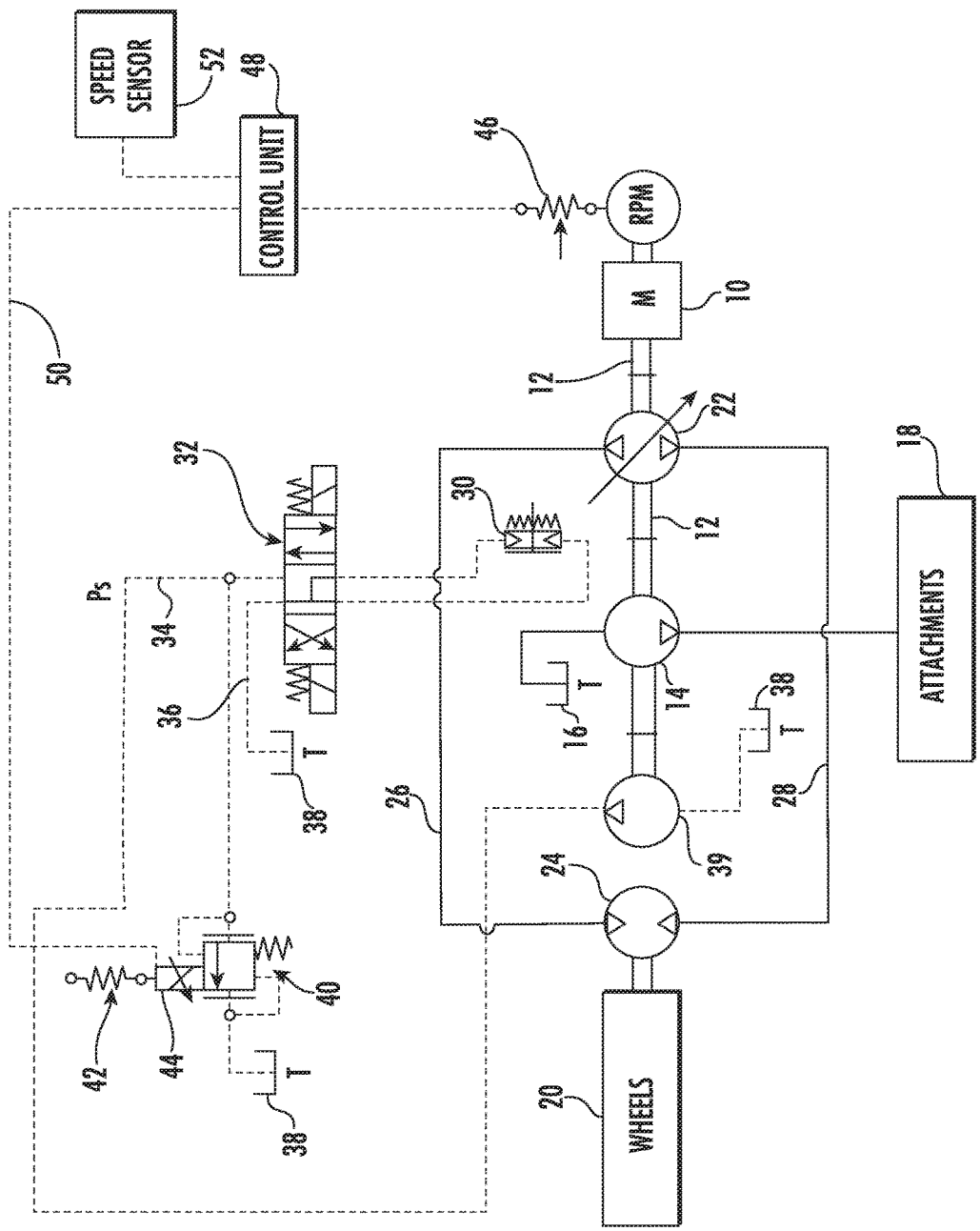

COMPACT WHEEL LOADER

FIELD OF THE INVENTION

The present invention relates to a compact wheel loader and all work vehicles with hydrostatic transmissions.

BACKGROUND OF THE INVENTION

Compact wheel loaders are compact vehicles that have road wheels, as opposed to caterpillar tracks, and that carry as a working implement that is hydraulically powered. The implement may be a bucket carried by a lifting arm or a rotating broom for road sweeping.

Compact wheel loaders have an engine to drive a hydraulic pump to produce the hydraulic pressure required by the implement. The same engine is also used to drive the wheels, which are commonly powered by means of a hydrostatic transmission. Such a transmission comprises a variable displacement, engine-driven, hydraulic pump connected to one or more hydraulic motors, usually of fixed displacement, driving the wheels. The control of the variable displacement pump is performed by a double acting spool, spring biased into a central position and connected to the swash plate of the pump. The double acting spool has a working chamber connected to receive hydraulic fluid at a pilot pressure that is produced by an engine driven pump and therefore varies with the engine speed and the other working chamber is connected to a drain line leading to a reservoir. In this way, the transmission ratio is varied automatically with engine speed to provide a high transmission ratio at low engine speeds and progressively lower transmission ratios with increasing engine speed.

A loader, or any other work vehicle is sometimes required to move slowly while the implement requires a high rate of flow. In this case, the engine speed needs to be high to produce the desired fluid flow rate to support the load but the transmission ratio also needs to be high to avoid excessive vehicle speed. It is therefore also known to provide additionally mechanical gearing somewhere in the drive train leading from the engine to the wheels to shift between different speed ranges. The gearing may be anywhere in the drive train, for example in the hydraulic wheel motors, and/or in the valving of the hydraulic pump, and/or in the drive from the engine to the hydraulic pump. In all speed ranges, however, the vehicle speed is varied by pressing on a demand lever, such as an accelerator pedal that adjusts the engine speed.

SUMMARY OF THE INVENTION

According to the present invention, there is provided a compact wheel loader, comprising road wheels, a hydraulically operated working implement, an engine, a pump driven by the engine to produce hydraulic fluid under pressure for powering the implement, a hydrostatic transmission having a variable displacement hydraulic pump and a hydraulic motor connected to the variable displacement pump and serving to drive a vehicle wheel, a double acting hydraulic spool spring biased into a neutral position for setting the displacement of the variable displacement pump, a pilot pressure pump for supplying to the double acting spool a pilot pressure that varies with the engine speed, and an operator controlled demand lever for controlling the vehicle speed, the loader having a normal mode of operation in which the demand lever serves to vary the engine speed and the double acting spool receives a pilot pressure dependent upon the prevailing engine speed and thereby sets the displacement of the variable displacement pump of the hydrostatic transmission in dependence upon the prevailing engine speed, characterised in that the loader has a creeper mode of operation in which the engine is operated at a constant speed, that is not set by the demand lever, and the demand lever serves to vary the pilot pressure supplied to the double acting spool by the pilot pressure pump to vary the speed of the loader by varying only the transmission ratio of the hydrostatic transmission.

In contrast with the prior art, when the loader of the present invention is operating in creeper mode, the engine speed is maintained constant and is not controlled by the demand pedal. Instead, the demand pedal only serves to vary the pilot pressure which in turn varies the transmission ratio to allow the loader to be driven at the desired speed without affecting the hydraulic fluid supply to the powered implement.

In some embodiments of the invention, no modification is made to the pilot pressure supply pump and instead a pressure reducing valve is used to reduce the pilot pressure by dumping some of the fluid in the pilot pressure line in dependence upon the position of the demand lever.

The pressure reduce valve may in some embodiments include a solenoid so that it may alternatively be controlled by an electronic control unit. In this case, the electronic control unit may control the loader to move at a constant speed using open loop or closed loop control. The speed may be set by means of switches analogous to those used in road vehicles equipped with cruise control; such switches including a "set" switch for memorising the prevailing speed, as well as "+" and "−" buttons to increment and decrement the desired speed.

Also in a manner analogous to the cruise control to be found in road vehicles, control of the speed by the electronic control unit may be discontinued by the operator by application of the vehicle brakes.

BRIEF DESCRIPTION OF THE DRAWING

The invention will now be described further, by way of example, with reference to the accompanying drawing which is a schematic diagram of a hydraulic system of a compact wheel loader.

DETAILED DESCRIPTION OF THE DRAWING

In the drawing, an internal combustion engine 10 is connected by a mechanical linkage 12 to drive a hydraulic pump 14 that is connected to a fluid reservoir 16 and supplies fluid under pressure to hydraulically driven attachments 18. Additionally, the engine 10 is used to drive the wheels 20 of the loader by a hydrostatic transmission comprising a variable displacement (swash plate) pump 22 connected to one or hydraulic motors 24 connected to, or mounted on, the wheels, by means of hydraulic lines 26 and 28.

The position of the swash plate of the pump 22 is set by means of a double acting spool 30 having two working chambers arranged on opposite sides of a piston that is connected by a piston rod to the swash plate of the pump 22. The piston is biases towards a central neutral position by means of springs. When the swash plate is displaced to one side of the central position, the wheel rotate in one direction and when it is displaced in the opposite direction the direction of wheel rotation is reversed. The further displaced the piston from its central position, the greater the displacement of the pump 22.

The two working chambers of the double acting spool 30 are selectively connectable by way of three-position four-port solenoid operated FORWARD/REVERSE valve 32 to a pilot pressure Ps line 34 and a drain line 36 leading to a reservoir 38. The pilot pressure Ps is produced by a pilot pressure pump 39 that is driven by the engine and as a result increases with increased engine speed.

As so far described, the hydraulic system is conventional and will be clear to the person skilled in the art with a relatively concise description. The engine 10 is started with the valve 32 in its illustrated position where both working chambers of the double acting spool 30 are connected to the drain line and the springs position the swash plate of the pump 22 in the neutral, zero displacement position.

To commence movement, the operator operates a FORWARD/REVERSE switch which moves the spool of the valve 32 to its right or left position, subjecting the appropriate side of the piston to the pilot pressure Ps while connecting the working chamber on the opposite side of the piston to the drain line 36. This results in movement of the swash plate of the pump 22 by an amount dependent on the pilot pressure Ps and hence the engine speed. At first, the displacement of the pump 22 will be small and the vehicle will move slowly. As the operator presses on the demand lever 42, usually an accelerator pedal, the engine speed increases, which in turn increases the pilot pressure Ps and increases the displacement of the pump, thereby increasing the transmission ratio and increasing the vehicle speed.

Because the same engine 10 is used to drive both the hydraulic pump 14 for the attachments and the pump 22 driving the wheels, the supply of hydraulic fluid to the attachments is limited by the vehicle speed. For instance in a road sweeper, a large amount of hydraulic fluid needs to be pumped to maintain the motion of the rotating brushes but the vehicle needs at the same time to move slowly and for these two requirements to be met the illustrated hydraulic system includes some additional components that will now be described and that allow the loader to be driven in creeper mode with the engine operating at an adjustable constant speed sufficiently high to meet the needs of the attachments 18.

In the illustrated embodiment of the invention, a proportional pressure reducing valve 40 is connected to the pilot pressure line 34 also known as an inching solenoid. This valve is controllable by a designated solenoid 44 which in one embodiment receives an electrical signal from an electrical sensor 42 associated with the demand pedal. When operating in creeper mode, the demand lever 42 is no longer used to select the engine speed and instead the engine speed is set to a desired high value by means of a separate panel mounted control knob, designated 46 in the drawing, connected to an electronic control unit 48.

Creeper mode is selected by pressing a creeper speed switch and setting the valve 32 to the neutral central position in which the pump 22 also operates with zero displacement, releasing the demand lever 42 so that the engine operates at idling speed and selecting a gear that provides the lowest speed range.

With the system now operating in creeper mode, the knob 46 is turn to raise the engine speed to the level needed for correct operation of the attachments 18. Next the driver direction is selected by means of the FORWARD/REVERSE switch that activates the valve 32 but at this time the solenoid 44 will have fully opened the pressure reducing valve 40 reducing the pilot pressure Ps to the same level as the drain line.

As the demand pedal 42 is next depressed by the operator to move the vehicle forward or backward, the pressure reducing valve 40 will be closed by the solenoid 44 in proportion to the depression of the demand lever, thereby increasing the pilot pressure Ps. The swash plate will therefore move to a position affording a higher transmission ratio but a slow movement of the vehicle, despite the high engine speed. With increased depression of the demand lever 42, the vehicle speed will be increased by a progressive increase in the transmission ratio caused by an increased displacement of the pump 22.

Instead of being controlled by a signal received from the 42 associated with the demand lever, the solenoid may be controlled in a third mode of operation by a signal 50 from the electronic control circuit (ECU) 48. The ECU 48 can apply a signal to the solenoid 44 calculated to maintain the vehicle speed at a constant desired value without modifying the engine speed.

If the third mode of operation is selected by the operator, actuation of a switch, acting as set button, will cause the present value of the signal applied to the solenoid 44 to be memorised and to continue to be applied to the solenoid 44 even if the demand lever is released. Should the operator wish to increase or decreased the speed while, remaining in automatic speed control, incrementing and decrementing signals may be sent to the ECU 48 by means of "+" and "−" button to reset the applies current to a higher or lower value. A double position unstable switch may be used where the "+" button is up and the "−" button and memory position is down.

The latter described control is open loop in that the current applied to the solenoid 44 is assumed to have the desired effect vehicle speed. It is however alternatively possible for the ECU 48 to operate in a closed loop relying on feedback from a sensor 52 detecting the actual vehicle speed. In this case, then automatic speed control is set, the ECU 48 memorises the actual vehicle speed as measured by the speed sensor 52 and thereafter varies the current applied to the solenoid in a manner to minimise the error between the memorised desired vehicle speed and the measured vehicle speed. Disabling of the automatic speed control is effected by applying the vehicle brakes. Discontinuing the creeper mode is effected by pressing the creeper speed switch or by neutral selection of the FORWARD/REVERSE switch.

The invention claimed is:
1. A work vehicle, comprising
a hydraulically operated working implement;
an engine;
a pump driven by the engine to produce hydraulic fluid under pressure for powering the hydraulically operated working implement;
a hydrostatic transmission comprising a variable displacement hydraulic pump and a hydraulic motor connected to the variable displacement pump for driving the vehicle;
a double acting hydraulic spool spring biased into a neutral position for setting a displacement of the variable displacement hydraulic pump;
a pilot pressure pump for supplying to the double acting spool a pilot pressure (Ps) that varies with a speed of the engine;
a pilot pressure line leading from the pilot pressure pump to the double acting hydraulic spool;

a pressure reducing valve connected to the pilot pressure line;

a reservoir; and a demand lever for controlling a speed of the vehicle, wherein the vehicle has a normal mode of operation in which the demand lever serves to vary the engine speed and the double acting hydraulic spool receives the pilot pressure (Ps) dependent upon a prevailing engine speed and thereby sets a displacement of the variable displacement pump of the hydrostatic transmission in dependence upon the prevailing engine speed, wherein the vehicle has a creeper mode of operation in which the engine is operated at an adjustable constant speed, that is not set by the demand lever, and the demand lever serves to vary the pilot pressure (Ps) supplied to the double acting hydraulic spool by the pilot pressure pump to vary the vehicle speed by varying only a transmission ratio of the hydrostatic transmission, and wherein the pressure reducing valve serves to reduce the pilot pressure (Ps) by returning a proportion of fluid in the pilot pressure line to the reservoir, the proportion decreasing with increased actuation of the demand lever.

2. The work vehicle of claim 1, further comprising an electronic control unit, the vehicle having a third mode operation in which the pressure reducing valve includes a solenoid operable by the electronic control unit to set the vehicle speed without requiring actuation of the demand lever.

3. The work vehicle of claim 2, wherein the electronic control unit is operative in response to actuation of a switch to memorize the vehicle speed and to apply signals to the solenoid to maintain movement of the vehicle at the vehicle speed.

4. The work vehicle of claim 3, wherein the electronic control unit includes a further operator actuated switch to increment or decrement the vehicle speed.

5. The work vehicle of claim 3, wherein the electronic control unit is connected to a vehicle speed sensor and is operative to set the vehicle speed by closed loop control of the solenoid to minimize error between a desired vehicle speed and a measured vehicle speed.

6. The work vehicle of claim 2, wherein the third mode of operation is disabled in response to braking of the work vehicle.

* * * * *